United States Patent [19]

Walton

[11] Patent Number: 4,654,658
[45] Date of Patent: Mar. 31, 1987

[54] IDENTIFICATION SYSTEM WITH VECTOR PHASE ANGLE DETECTION

[76] Inventor: Charles A. Walton, 19115 Overlook Rd., Los Gatos, Calif. 95030

[21] Appl. No.: 637,546

[22] Filed: Aug. 3, 1984

[51] Int. Cl.⁴ .............................................. H04Q 1/00
[52] U.S. Cl. ........................... 340/825.54; 340/825.69; 340/825.72; 342/44
[58] Field of Search ...................... 340/825.06, 825.10, 340/825.34, 825.69, 825.72, 825.54, 825.70, 539, 572, 573, 825.3, 825.64; 343/6.5 R-6.8 LC; 455/41, 70, 71; 361/172; 235/439-444, 380, 488

[56] References Cited

U.S. PATENT DOCUMENTS

| | | | |
|---|---|---|---|
| 2,927,321 | 3/1960 | Harris | 343/6.5 R |
| 3,299,424 | 6/1967 | Vinding | 343/6.8 R X |
| 3,806,905 | 4/1974 | Strenglein | 343/6.8 R X |
| 3,859,624 | 1/1975 | Kriofsky et al. | 343/6.5 R X |
| 4,209,783 | 6/1980 | Ohyama et al. | 343/6.5 LC X |
| 4,333,072 | 6/1982 | Beigel | 340/825.54 |
| 4,388,524 | 6/1983 | Walton | 340/825.72 X |
| 4,517,563 | 5/1985 | Diamant | 340/825.54 |

Primary Examiner—Ulysses Weldon
Attorney, Agent, or Firm—Thomas E. Schatzel

[57] ABSTRACT

An electronic identification and recognition system which detects vector phase angle changes. The recognition section radiates power to the identification section. The phase angle of the current in the identifier antenna is determined by a clock and memory system which varies the reactance of the identifier antenna circuit. The change in reactance affects the phase angle of the voltage within the reader antenna. The phase angle changes are detected and recorded by the recognition section such that the internal code of the identifier section is determined.

9 Claims, 3 Drawing Figures

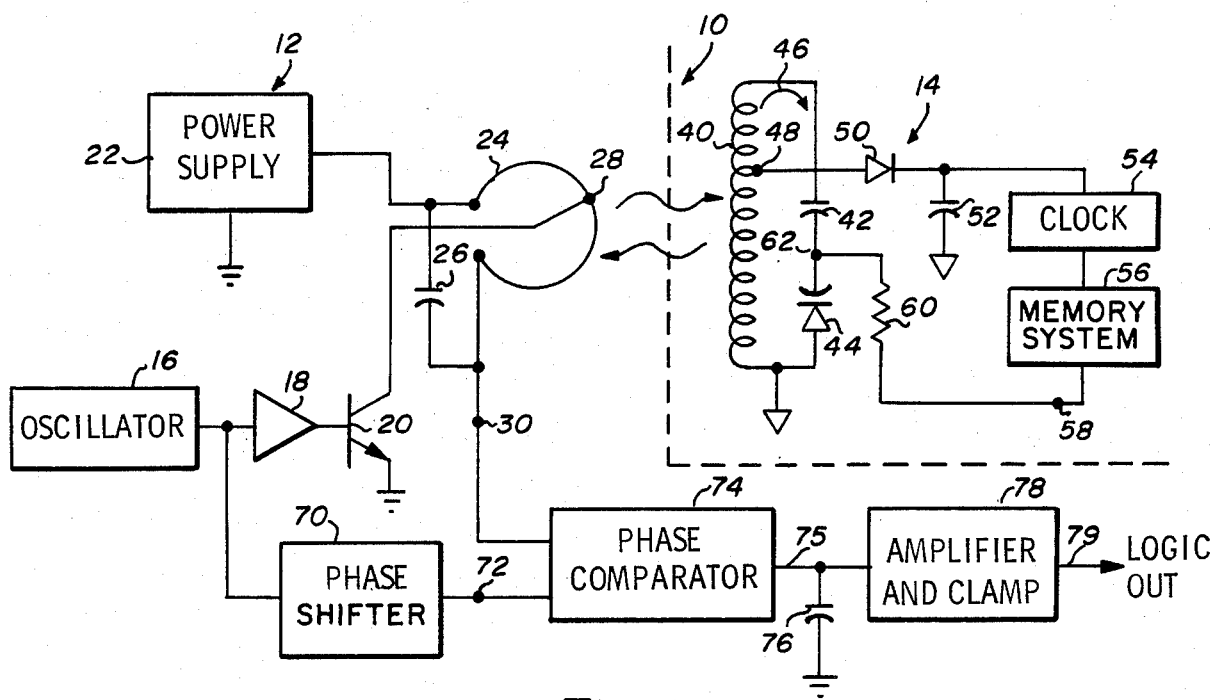
Fig_1
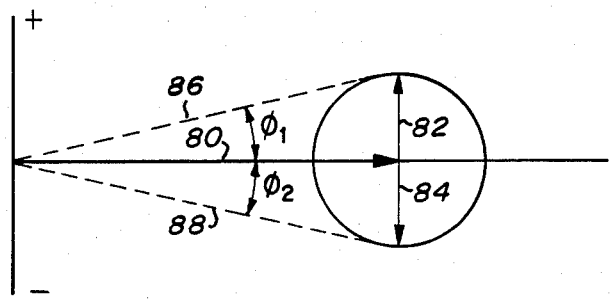
Fig_2
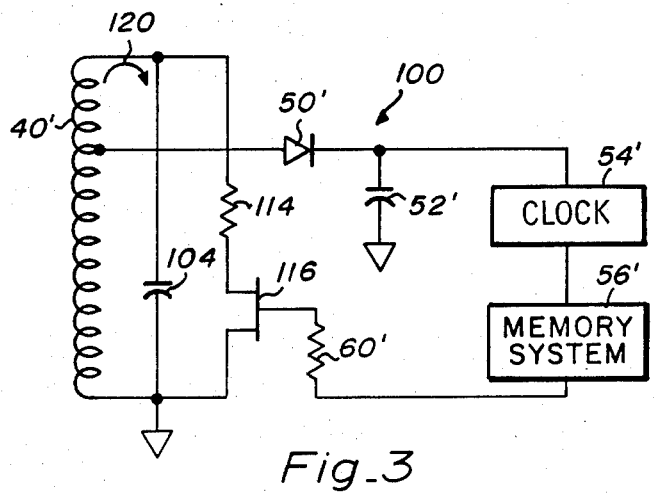
Fig_3

IDENTIFICATION SYSTEM WITH VECTOR PHASE ANGLE DETECTION

BACKGROUND OF THE INVENTION

1. Field of the Invention

This invention relates generally to electronic identification and recognition systems and more specifically to such systems wherein it is not necessary to make physical contact between the identification card and the recognition apparatus.

2. Description of the Prior Art

There are various electronic identification and recognition systems wherein the identifying device is portable. Sometimes the identifying device is referred to as a "card," "tag," "key," or the like. The recognition station or reader station is prepared to recognize identifying devices of predetermined characteristics when such identifying device is brought within the proximity of the reader station. Inductive coupling takes place between the two devices when they are proximate to one another and it is not necessary to bring the device into physical contact. Though, the identifying device may contain a battery, it usually receives its energy from the reader station.

Uses for such systems may include identification of persons having identifying devices in their possession. For example, the identifying device may take the shape of a credit card and having an electronic circuit embedded therein for radiating signals of identifying intelligence. An individual possessing the card may position it adjacent a door that the individual desires to enter. A recognition device may be arranged to control the door latch and if it recognizes radiated signals of certain predetermined intelligence, the door latch responds to the reader when the individual places the "card" proximate to the reader. Other uses for such systems include having the identifier in the form of a tag attached to a vehicle to be identified. As the vehicle passes a certain location, it's identification is recognized and recorded. Also, in production lines, garments or other items may carry identifying tags so that they can be appropriately processed as they are recognized along various points in the production processes.

The prior art includes various patents and patent applications by the present inventor. The patents include U.S. Pat. No. 3,752,960 for "lectronic Identification and Recognition System," issued Aug. 14, 1973; U.S. Pat. No. 3,816,708 for "Electronic Recognition and Identification System," issued June 11, 1974; U.S. Pat. No. 3,816,709 for "Electronic Identification and Recognition System," issued June 11, 1974; U.S. Pat. No. 4,142,674 for "Recognition and Identification Key Having Adaptable Resonant Frequency and Methods of Adapting Same," issued Mar. 6, 1979; U.S. Pat. No. 4,223,830 for "Identification System," issued Sept. 23, 1980; U.S. Pat. No 4,236,068 for "Personal Identification and Signaling System," issued Nov. 25, 1980; U.S. Pat. No. 4,384,288 for "Portable Radio Frequency Emitting Identifier," issued May 17, 1983; and U.S. Pat. No. 4,388,524 for "Electronic Identification and Recognition with Code Changeable Reactants," issued June 14, 1983; U.S. Pat. No. 4,459,474 for "Identification System with Separation and Direction Capability and Improved Noise Rejection," filed on May 18, 1981; U.S. Pat. No. 4,473,825 for "Electronic Identification System with Power Input-Output Interlock and Increase Capabilities," filed on Mar. 5, 1982; U.S. Pat. No. 4,546,241 for "Identification System with Synchronous Modulation of Return Signal," filed on Dec. 10, 1982; U.S. Pat. No. 4,580,041 for "Electronic Proximity Identification System With Simplified Low Power Identifier," issued Apr. 1, 1986; and U.S. Pat. No. 4,600,829 for "Electronic Proximity Identification and Recognition System with Isolated Two-Way Coupling," issued on July 15, 1986.

Also, the prior art includes U.S. Pat. No. 3,732,465 for "Electronic Sensing and Actuator System," issued May 8, 1973 to Ronald S. Palmer and Charles A. Walton; U.S. Pat. No. 3,842,246 for "Recognition and Identification System with Noise Rejection Capabilities," by Robert D. Kohler, David P. Sidlauskas and Charles A. Walton, issued May 18, 1976; U.S. Pat. No. 3,958,105 for "Electronic Recognition and Identification System for Identifying Several Master Keys," issued May 18, 1976 to David P. Sidlauskas; and U.S. Pat. No. 3,970,824 for "Electronic Recognition and Identification System for Identifying a Family of Codes," by Charles A. Walton, Robert D. Kohler, and David P. Sidlauskas, issued July 20, 1976.

In the electronic portable recognition and identifier systems of the prior art, there are two directions of communications between the reader and the identifier devices. The reader (recognition section), which is typically stationary, must send an interrogation signal and/or power to the identifier device (e.g., card, tag, key), which is typically portable. In response, the identifier device sends a coded signal bearing intelligence about its identification to the reader. Means must be provided so that two directions of communication and power do not interfere to the extent of inhibiting the desired transfers. In the general class of electronic portable identification and recognition systems, inductive coupling is used between the reader and the identifier, although electric field dipole antenna coupling can also be used. A further characteristic is that often both power and data are transmitted over the same inductively coupled coils. In some of the reference prior art, noninterference between the two paths of the reader and identifier is achieved by engineering principles such as time separation, or differing frequencies, or by modulation of the electromagnetic power field and detection of such modulation in the radiated reader field. A disadvantage of time separation is the increase in total transaction time. A disadvantage of differing frequencies is that the coil of the portable identifier cannot be tuned simultaneously to two different frequencies. Such inability to tune, makes one direction inefficient. A disadvantage of power field modulation is that power losses occur in the identifier when the identifier modulates the power field. Another disadvantage of power field modulation is that the recognition antenna cannot be operated at peak voltage, but must be operated at frequencies on either side of the resonance curve in order for the changes in amplitude to be detectable.

SUMMARY OF THE PRESENT INVENTION

It is therefore an object of the present invention to provide an electronic recognition and identification system which overcomes the problem of power losses in the identifier.

It is a further object of the present invention to provide an electronic recognition and identification system which has increased system sensitivity and range of performance.

It is a further object of the invention to provide a system which can be operated at peak resonance.

In an exemplary embodiment of the present invention the system incorporates a recognition section and an identification section. The identification section contains identification data which the reader interrogates for and then receives. The identification section does not physically contact the recognition section. Inductive coupling from the recognition section powers the identification section. The power within the identification section operates a clock and memory system which emits intelligent logic signals.

The recognition section incorporates an oscillator controlled power supply which drives a reader antenna. Power is radiated by and from the reader antenna to the identifier antenna in the identification section. The clock and memory system emit logic value signals which in turn vary the reactance of the identifier antenna circuit. This reactance change, through inductive coupling from the identifier antenna to the reader antenna, changes the vector phase angle of the voltage within the reader antenna. The recognition section contains a phase comparator which compares the vector phase angle of the reader antenna voltage with a reference signal from the oscillator. The changes in the phase angle represent the code of the identification section and it may be reported to data processing equipment at the recognition section for any further data processing or action. For example, the information, after decoding, may be utilized to open or close doors, allow the lifting of a parking lot gate, notify a central authority, disperse funds, etc.

An advantage of the present invention is that it overcomes the problem of power losses in the identification section.

Another advantage of the present invention is that it has increased system sensitivity and range of performance.

A further advantage of the invention is that it can be operated at peak resonance.

These and other objects and advantages of the present invention will no doubt become obvious to those of ordinary skill in the art after having read the following detailed description of the preferred embodiments which are illustrated in the various drawing figures.

IN THE DRAWING

FIG. 1 is a circuit diagram of an electronic recognition and identification system in accordance with the present invention;

FIG. 2 illustrates the change in the vector phase angle of the voltage in the reader antenna of FIG. 1; and FIG. 3 is a circuit diagram of a second embodiment of the identifier section of the present invention.

DETAILED DESCRIPTION OF THE PREFERRED EMBODIMENT

FIG. 1, illustrates a circuit diagram for a recognition and identification system of the present invention and referred to by the general reference character 10. The system 10 incorporates a recognition section 12 and an identification section 14.

The recognition section 12 contains an oscillator 16. Oscillator 16 is crystal controlled and operates at a fixed frequency, typically 13.56 MHz. The signal from the oscillator 16 is amplified by an amplifier 18 and applied to a power output transistor 20. Power in the recognition section 12 is supplied by a power supply 22. The transistor 20 drives a reader antenna 24. Reader antenna 24 is tuned at or close to the oscillator 16 frequency by a capacitor 26.

For operation at the typical frequency of 13.56 MHz the reader antenna 24 is a six inch square single turn loop antenna. The radio frequency voltage which can be applied to the reader antenna 24 is limited by the power supply voltage available. For example, if the power supply voltage is twenty-four volts, the voltage swing at the reader antenna 24 drive point, which is the collector or drain of the transistor 20, is limited to forty-eight volts. This limitation can be overcome if the reader antenna 24 is driven at a fractional point 28. Driving at fractional point 28, which might be at the 40 percent point on the loop, or 144 degrees from the power supply point (which is at alternating current ground), the voltage swing at point 28 will be forty-eight volts, but at the tip of the loop (tuning is assumed) the voltage swing at a point 30 will be $1/0.40 \times 48$ volts, or 120 volts. The principles and effect are analogous to driving an auto transformer at a low tap, or driving a Tesla coil.

The resonance quality "Q" is maximized and power radiation improved if the reader antenna 24 uses a large diameter heavy conductor. For larger diameters the wire inductance is reduced. This results in larger circulating currents and improved "Q" for the reader antenna 24.

Reader antenna 24 is inductively coupled to an identifier antenna 40 of the identification section 14. The magnitude of the mutual coupling depends upon the proximity of the identification section 14 to the recognition section 12. The mutual coupling is zero when the identification section 14 is remote and high when the identification section 14 is close. The identifier antenna 40 is tuned by a capacitor 42 and a varactor 44. Varactor 44 is a reversed biased diode which has a capacitance which varies with the applied voltage. A radio frequency oscillating current 46 flows through the identifier antenna 40.

An analysis of the vector and phase interrelationships between reader antenna 24 and the identifier antenna 40 is presented in an article entitled "Reference Data for Radio Engineers" published in ITT, Sixth Edition, pages 7-9. When applying the above mentioned analysis to the present invention, the resonance quality "Q", the frequency, and, at a fixed distance, the coefficient of coupling are all considered to be constant.

The reader antenna 40 is tapped at a point 48, and the voltage across this tap is rectified by a diode 50, smoothed by a capacitor 52, and serves as a power supply source to a clock 54 and a memory system 56. Clock 54 and memory system 56 begin to operate when the voltage of the power source rises above the necessary value. Data representing the identification section 14 is emitted from the memory system 56, illustrated as point 58, and is in the form of a string of pulses. The distinction between the logic "ones" and "zeros" may be made in the same manner as that described in the referenced prior art patents and applications. The data at point 58 is applied through a resistor 60 to a junction point 62 between capacitor 42 and varactor 44. Resistor 60 is needed to avoid shunting the radio frequency present on varactor 44 into the logic circuits.

The effect of varying the voltage at point 62 is to change the capacitance of varactor 44, and thereby change the vector phase angle of the current 46 in the identifier antenna 40. This change in phase angle of current 46 is inductively coupled to the reader antenna 24, and affects the vector phase angle of the power signal in the reader antenna 24.

The oscillator 16 in the recognition section 12 also sends a signal to a phase shifter 70. Phase shifter 70 adjusts the phase of the reference signal and the resulting signal is produced at a point 72. Phase shifter 70 is adjusted so that when the identification section 14 is not present, the phase of the signal at point 72 is closely equal to the phase signal from the reader antenna 24 at point 30. Phase shifter 70 is implemented by a resistance-capacitance lag circuit, in which an adjustable resistance produces desired amounts of time lag into the path of the oscillator sine wave. The loss of signal strength due to the resistance is recovered by amplifying the signal.

The signals from points 30 and 72 are compared by a phase comparator 74. The output of phase comparator 74 varies in levels positively and negatively according to the phase relationships of the two inputs. When the identification section 14 is present, there is useful output from the phase comparator 74. This output signal is representative of the data from the memory system 56 of the identification section 14. One choice for a phase comparator 74 is described by National Semiconductor Corporation in the "CMOS Databook," 1984, pages 1–367. Also, standard CMOS or TTL logic blocks may be assembled to form a phase comparator. A phase comparator is also referred to as a BALANCED MODULATOR-DEMODULATOR.

The radio frequency component from the output signal of the phase comparator 74 is smoothed by a capacitor 76. The output then passes through an amplifier and clamp network 78. The logic signal is then used for further data processing steps, e.g. controlling locks, recording devices, etc.

FIG. 2 shows the vectors and phase angles which represent the voltages within the reader antenna 24 of FIG. 1 as affected by the inductive coupling with the identification section 14. A reference vector 80 represents the basic power excitation from power transistor 20. A pair of induced voltage vectors 82 and 84 represent two of the possible values of the voltage induced in the reader antenna 24. The induced voltage vectors 82 and 84 can swing through a variety of phase angles which are determined by the phase angle of current 46 flowing in the identifier antenna 40. Vectors 82 and 84 are in actuality the same vector shown in the two extreme positions. The phase angle of current 46 is determined by the combined reactance of capacitance 42, varactor 44 and the identifier antenna 40. The induced voltage vectors 82 and 84 will vary in magnitude according to the proximity of the recognition section 12 to the identification section 14 and according to the resonance quality "Q" of the identification section 14 and will vary in phase according to the capacitance value of varactor 44. The reference phase vector 80 is added to the induced voltage vector 82 or 84 to produce a net voltage vector 86 or 88. Vectors 86 and 88 are the same vector shown in two positions. The resultant voltage as represented by the net voltage vectors 86 and 88 is present at point 30. The phase comparator 74 of FIG. 1 detects the differences between the phase angles of the net voltage vector 86 or 88 at point 30 and the reference phase vector 80 at point 72. The output at line 75 of the phase comparator 74 is a voltage proportioned to the difference in phase between vector 80 and 86 or 88. The voltage on line 75 is amplified and clamped to logic levels to produce a useful voltage representation at line 79 of the data from memory system 56.

FIG. 3 illustrates an alternative embodiment of an identification section and is referred to by the general reference character 100. The components of FIG. 3 similar to those of FIG. 1, carry the same reference numeral distinguished by a prime designation. Identification section 100 uses resistive means to vary the induced voltage rather than the capacitance means of the identification section 14 of FIG. 1. An identifier antenna 40' is tuned by a capacitor 104. The identification section 100 contains a diode 50' a capacitor 52' a clock 54' and a memory system 56'.

The identifier antenna 40' is shunted by a resistor 114. The presence of resistor 114 within the circuit is controlled by a FET (field effect transistor) 116, which in turn is controlled by the data signal coming from the memory system 56'. This data signal passes through a resistor 60' on its way to the transistor 116. A current flow 120 and the resonance quality "Q" of the identifier antenna 40' is affected by the presence or absence of shunt load 114. The induced voltage vector 82 or 84 of FIG. 2 is affected by this change of reactance current flow. The phase angles of the net voltage vectors 86 or 88 change, and this change is detected by the phase comparator as previously described.

The system of FIG. 1 can also be used to detect vector phase angle changes in the second and higher harmonics rather than the fundamental wave as described above. The identification section 14 is non-linear in its loading, since it contains the diode 50 for rectifying the fundamental wave and generating power. This nonlinearity induces secondary and higher harmonics in the field between the recognition section 12 and the identification section 14. These harmonics change as the coded changes occur in the reactance and impedance of the identification section 14. Within the recognition section 12, when seeking second harmonics, the phase comparator 74 is driven at the second harmonic of the oscillator 16, rather than at the primary frequency. The phase comparator 74 detects and reports the changes in the phase angle of the second harmonic present in the field. The advantage of detecting the second and higher harmonic changes rather than the fundamental changes is that the large primary voltage of the fundamental wave does not need to be rejected.

Although the present invention has been described in terms of the presently preferred embodiments, it is to be understood that such disclosure is not to be interpreted as limiting. Various alterations and modification will no doubt become apparent to those skilled in the art after having read the above disclosure. Accordingly, it is intended that the appended claims be interpreted as covering all alterations and modification as fall within the true spirt and scope of the invention.

I claim:

1. An electronic recognition and identification system comprising:

a recognition section including an oscillator, a reader antenna means connected to said oscillator and a power supply for radiating electromagnetic power responsive to said oscillator, an amplifier connected intermediate said oscillator and said reader antenna for amplifying the signal from said oscillator, a transistor connected intermediate said amplifier and said reader antenna to control the flow of power from said supply to said reader antenna, detection means comprising a phase shifter connected to said oscillator to modify the signal from said oscillator and a phase comparator connected to said phase shifter and to said reader antenna to compare the phase angles of the signals from said phase shifter and said reader antenna and for delivering output signals responsive to said changes in vector phase angle, and a filter connected to the output of said phase comparator, said filter being joined to an amplifier and clamp such that the output from the recognition section is in the form of logic data; and an identification section having an identifier antenna for receiving power from said reader antenna by mutual coupling, a reactance modulation circuit connected to the identifier antenna, a tap on said identifier antenna to tap the voltage across a portion of said identifier antenna, rectifier means intermediate said tap and a data register means, and said data register means comprising a clock and a memory system for providing an advance and sequence of data joined to said reactance modulation circuit, such that the vector phase angle of the current of said modulation circuit varies responsive to said sequence of data.

2. The system of claim 1 wherein,
the identification section further includes a varactor means connected across the identifier antenna to tune said identifier antenna to predetermined frequencies and to vary the tuning in accordance with said sequence of data.

3. The system df claim 7 wherein,
the data from said clock and memory system is passed through a resistor and is then applied to said varactor such that said varactor controls the phase angle of the current passed through the identifier antenna responsive to said data from said clock and memory system.

4. The system of claim 1 further including,
a fixed capacitor connected across said identifier antenna to tune said identifier antenna to predetermined frequencies.

5. The system of claim 4 wherein,
the recognition section further includes a resistor to receive data from said clock and memory system, a transistor tied to said resistor to receive data signals from said resistor, and a shunt resistor tied to said transistor and to said identifier antenna such that said transistor controls the phase angle of the current passing through the identifier antenna responsive to said data from said clock and memory system.

6. The system of claim 1 wherein, said reader and identifier antennas are loop antennas, such that power is radiated by indictive coupling from said reader antenna to said identifier antenna, and said identification section radiates the changes in vector phase angle to the recognition section by inductive coupling.

7. The system of claim 6 wherein, the reader antenna is a single loop driven by said transistor at a fractional point and is tuned by a capacitor at or close to said oscillator frequency.

8. The system of claim 1 wherein,
said phase comparator is driven at the second or higher harmonic of said oscillator and compares the vector phase angles of the second or higher harmonics of the signals from said phase shifter and said reader antenna.

9. The system of claim 6, in which power radiation is increased by driving the inductive antenna at a fractional turn position, achieving a greater overall output voltage level from a given power supply voltage.

* * * * *